United States Patent [19]

Turkowski et al.

[11] Patent Number: 5,926,190
[45] Date of Patent: Jul. 20, 1999

[54] METHOD AND SYSTEM FOR SIMULATING MOTION IN A COMPUTER GRAPHICS APPLICATION USING IMAGE REGISTRATION AND VIEW INTERPOLATION

[75] Inventors: Kenneth E. Turkowski, Menlo Park; Heng-Yeung Shum, San Jose, both of Calif.

[73] Assignee: Apple Computer, Inc., Cupertino, Calif.

[21] Appl. No.: 08/701,817

[22] Filed: Aug. 21, 1996

[51] Int. Cl.$^6$ ..................................................... G06F 15/00
[52] U.S. Cl. ................................................................ 345/473
[58] Field of Search .................................... 345/435, 440, 345/441, 442, 475, 473

[56] References Cited

U.S. PATENT DOCUMENTS 5,818,461  10/1998  Rouet et al. ............................. 345/473

OTHER PUBLICATIONS

Shenchang Eric Chen; QuickTime VR–An Image–Based Approach to Virtual Environment Navigation; Apple Computer, Inc. Aug. 1995.

Leonard McMillan & GAry Bishop; Plenoptic Modeling: An Image–Based Rendering System; Dept. of Computer Science Univ. of North Carolina Aug. 1995.

Paul S. Heckbert; Basic Texture Mappings and Image Warps; Dept. of Electrical Engineering & Computer Science Univ. of CA Berkeley Mar. 29, 1989.

Richard Szeliski and James Coughlan; Spline–Based Image Registration; Digital Equipment Corp. Cambridge Research Lab Apr., 1994.

Peter Litwinowicz and Gavin Miller; Efficient Techniques for Interactive Texture Placement; Apple Computer, Inc. Jul. 1994.

Thaddeus Beier, Shawn Neely; Feature–Based Image Metamorphosis; Silicon Graphics Computer Systems; Pacific Data Images Jul. 1992.

Primary Examiner—Phu K. Nguyen
Attorney, Agent, or Firm—Sawyer & Associates

[57] ABSTRACT

A system and method for simulating motion in an interactive computer application wherein images of a scene are used to render views of the scene from particular viewpoints. The method and system includes registering a first image and a second image using a transformation that overlays common features of both the first and the second image. After the two images are registered, at least one intermediate image is generated by applying a first interpolated transformation to the first image and a second interpolated transformation to the second image. The first image, the intermediate image, and the second image are then sequentially rendered to simulate motion through the scene.

21 Claims, 8 Drawing Sheets

METHOD AND SYSTEM FOR SIMULATING MOTION IN A COMPUTER GRAPHICS APPLICATION USING IMAGE REGISTRATION AND VIEW INTERPOLATION

FIELD OF THE INVENTION

The present invention relates to computer graphics, and more particularly to a method and system for simulating motion in an interactive computer graphics application using image registration and view interpolation.

BACKGROUND OF THE INVENTION

A moving picture movie is displayed by rapidly sequencing through a series of still images. Typically, the movie is acquired with a film movie camera or a video camera capturing the images 24, 50, or 60 times a second. This type of motion is considered linear in the sense that the images comprising the movie are played from the beginning to the end, with no interactivity.

In contrast to a conventional movie, an interactive multimedia application enables a user to move through a synthetically modeled environment, and hence, allows the user to control the sequence in which the images are displayed. The user interactively controls both position and orientation within the model, exploring the model space through various modes of navigation. Examples of such navigational modes are walking, jumping, driving, floating, flying, spinning, object-manipulating, head-turning, and zooming.

Such interactive environments may be implemented using two types of systems; polygon-based rendering systems, and image-based rendering systems. In a polygon-based rendering system, the interactive environment is created using a 3D model. The polygon-based rendering system uses the 3D model to compute new views of scene based on the user's movement. This requires the rendering system to compute fifteen or more new images of the scene each second to create a sensation of motion. Therefore, as a practical matter, the complexity of the 3D model is limited to enable the system to generate the images quickly enough.

An image-based rendering system avoids the need to limit model complexity by using digital images to create the interactive environment, rather than 3D models. Because image-based rendering systems resample source images of a scene, rather than relying on a polygonal representation of that scene, the imagery can be as complex as the image representation allows without affecting the computational cost. In particular, the image representation of the scene can be photographic, or can be pre-rendered over a considerable amount of time, as only run-time resampling must take place at interactive rates. Since the user has control over the speed and direction of the progression of the multimedia presentation, time is generally not applicable to this type of interactive multimedia content. As a result, multimedia content tends to be organized spatially or topically, rather than, or in addition to, temporally.

To create the interactive environment, a view of a scene is typically captured at various locations. The spatial relationship between these views is recorded, either as coordinates and orientations in space, known as a metric representation, or in a network of adjacencies, known as a topological representation. Typically, a combination of metric and topological representation is used. A full metric representation can be processed to derive a topological representation, but not vice versa. If a large number of views are provided for a scene, then playing or sampling an appropriate sequence of these views yields the sensation of motion.

Interactive multimedia implemented using image-based rendering requires much more data than linear movies in order to represent the myriad of paths that the user can take. Thus, in image-based rendering, it is the size and the number of the images representing the scene that is the limiting factor, rather than the scene's complexity. Because of its large data storage requirements, image-based rendering can limit the amount of multimedia content that can be stored on fixed capacity media, such as CD-ROMs.

Based on the above, it would be desirable to synthesize a large number of views from a smaller set in order to reduce the number of images that need to be stored. In some navigational modes, a number of views can, and are, synthesized from a single image. Examples include spinning, panning, and zooming, which are implementable with standard rotation, translation, and scaling techniques. Other navigational modes, however, such as walking, driving, and flying, where the user is moving through the scene, still require the rendering of many images in order to simulate movement.

What is needed therefore is a method and system for simulating movement in an interactive image-based environment that reduces the storage requirements of the interactive application. The present invention addresses such a need.

SUMMARY OF THE INVENTION

The present invention provides a method and system for simulating motion in an interactive computer application wherein images of a scene are used to render views of the scene from particular viewpoints. The method and system includes registering a first image and a second image using a transformation that overlays common features of both the first and the second image. After the two images are registered, at least one intermediate image is generated by applying a first interpolated transformation to the first image and a second interpolated transformation to the second image, followed by a composition of the two. The first image, the intermediate images, and the second image are then sequentially rendered to simulate motion through the scene.

According to the system and method disclosed herein, the present invention enables a set of intermediate views to be synthesized from two extreme views, thereby enhancing the sensation of smooth movement through a scene, while reducing the storage requirements of the interactive application.

DESCRIPTION OF THE INVENTION

The present invention relates to an improvement in rendering systems. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
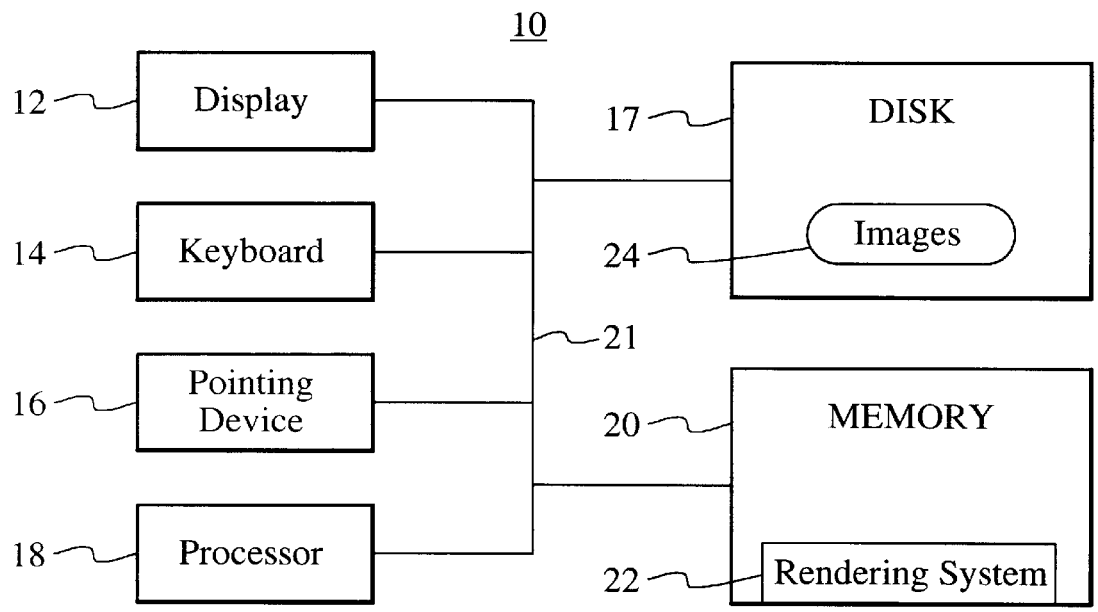
FIG. 1 is a block diagram illustrating a conventional computer system that serves as one type of operating environment for the present invention.

FIG. 1 is a block diagram illustrating a conventional computer system 10, which serves as one type of operating environment for the present invention. The computer system 10 includes a display 12, a keyboard 14, a pointing device 16, a disk 17, a processor 18, and a memory 20, which are all connected by a bus 21. The processor 18 operates in conjunction with the memory 20 to execute a rendering system 22 that enables a user to navigate through an interactive multimedia application (not shown) using the keyboard 14 and/or the pointing device 16. The rendering system 22 may be loaded into the memory 20 from some form of computer-readable medium, such as CD-ROM, or from a network. In one preferred embodiment, the rendering system 22 may be similar to QuickTime VR from Apple Computer, Cupertino, Calif. Although the rendering system 22 is described as being implemented in software, the rendering system 22 may also be implemented in hardware.

Figure 2:
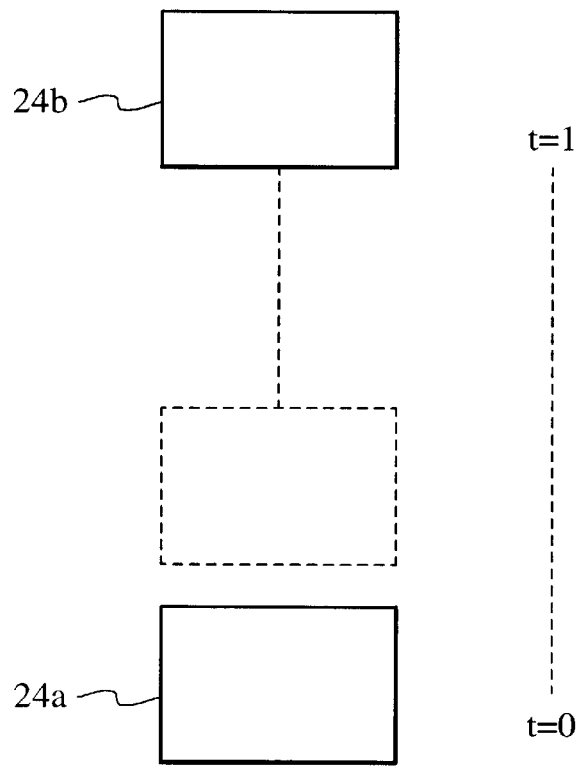
FIG. 2 is a one dimensional top view of a sequence of images that represent different viewpoints of a scene to a user.

Various scenes in the multimedia application are implemented using a set of digital images 24 that reside on the disk 17, which may represent a hard disk or CD-ROM, for example. As the user moves about a scene, the rendering system 22 renders the digital images 24 in sequential order on the display 12 to simulate motion. FIG. 2 shows a sequence of images 24 that represent different views of a scene, with the viewing image 24a shown earlier in the sequence and that of image 24b shown later in the sequence. The first image in such a sequence (image 24a) is called the "front image" and the last image (image 24b) "the back image". Without loss of generality (since time can be reparametized by an affine transformation t=as+b), we show the front image at time t=0 and the back image at time t=1.

If image 24a and 24b had widely different viewpoints, then conventional methods would need to also render intermediate images, as shown by the dotted lines, in order to simulate smooth motion through the scene. Typically, these intermediate images would also have to be stored on the disk 17. As stated above, this type of traditional image-based rendering system has the disadvantage of having large data storage requirements in order to store all the images 24 necessary for interactive multimedia applications, such as interactive movies.

The present invention provides a method and system for simulating motion in an interactive image-based computer-application by synthesizing one or more intermediate images from two separate images 24, and then displaying the images 24 in sequence. Generating intermediate images from two separate images 24 reduces the size of the set of images comprising the multimedia application, which in turn, enables the multimedia application to include more content. To more particularly describe the method and system of the present invention, refer now to FIGS. 3 and 4a–4c illustrating one embodiment of such a system.

Figure 3:
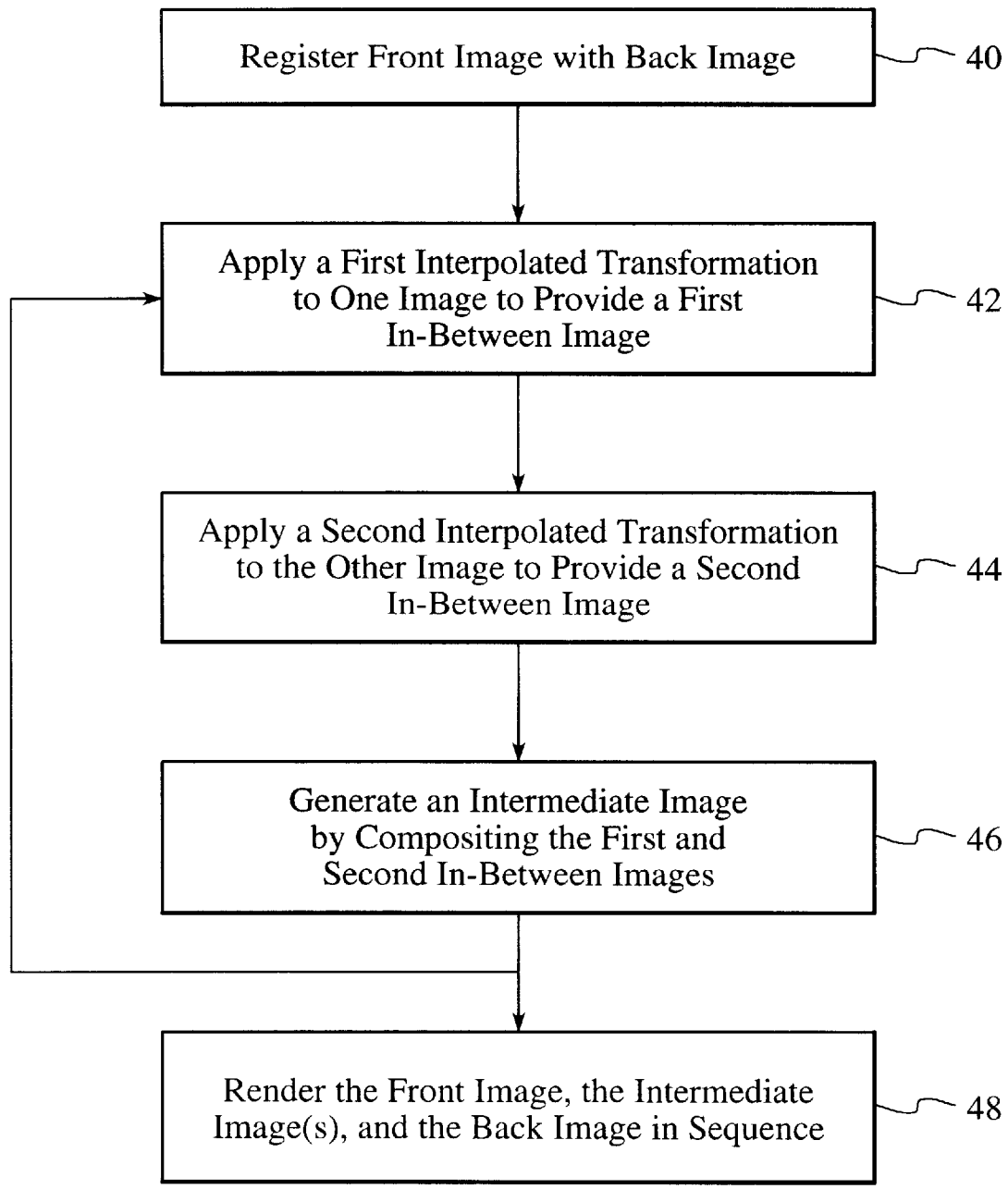
FIG. 3 is a flow chart illustrating the process of simulating motion in an interactive image-based computer-application in accordance with the present invention.
Figure 4A:
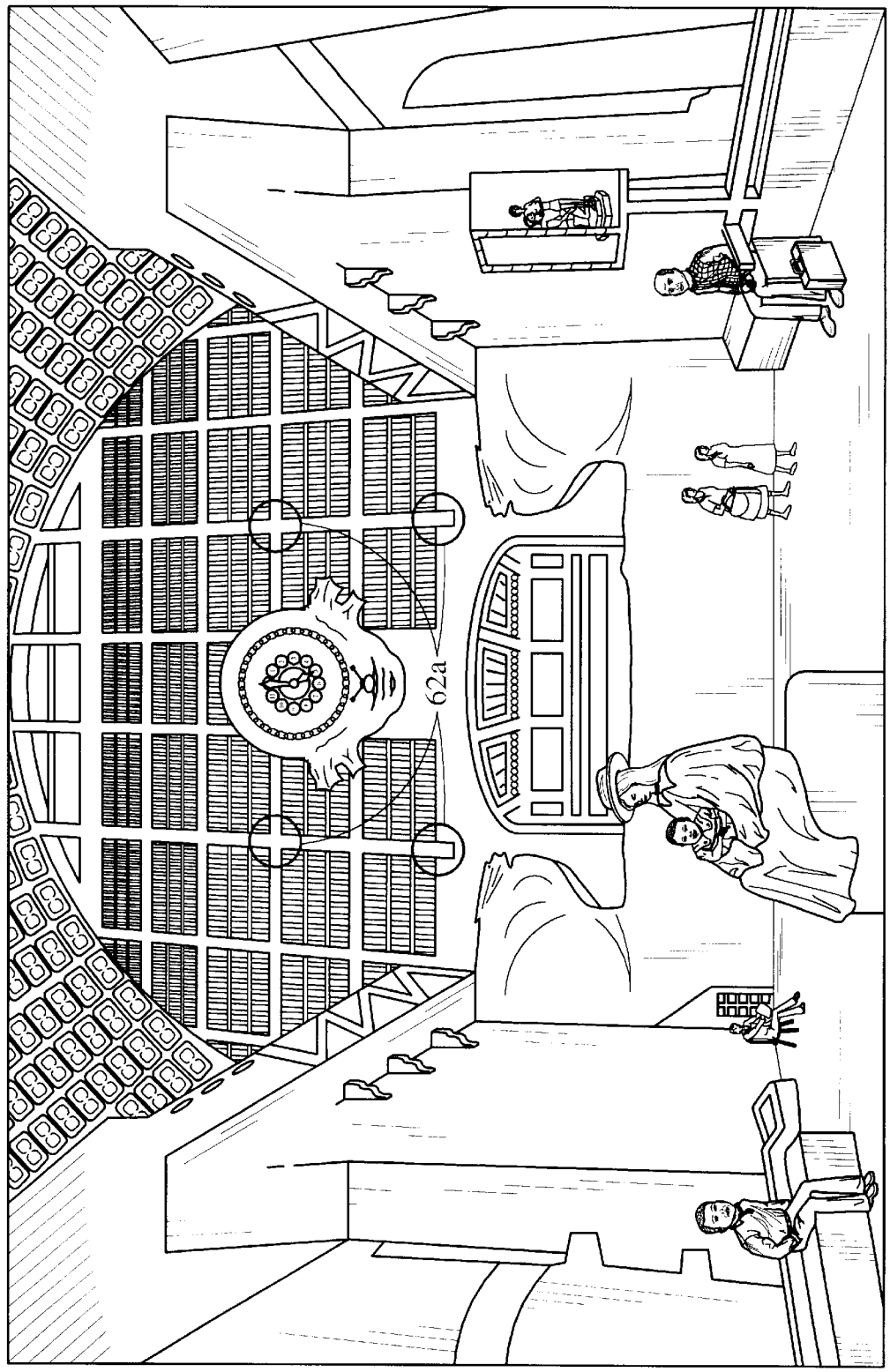
FIGS. 4a, 4b, and 4c are example photographic images.
Figure 4B:
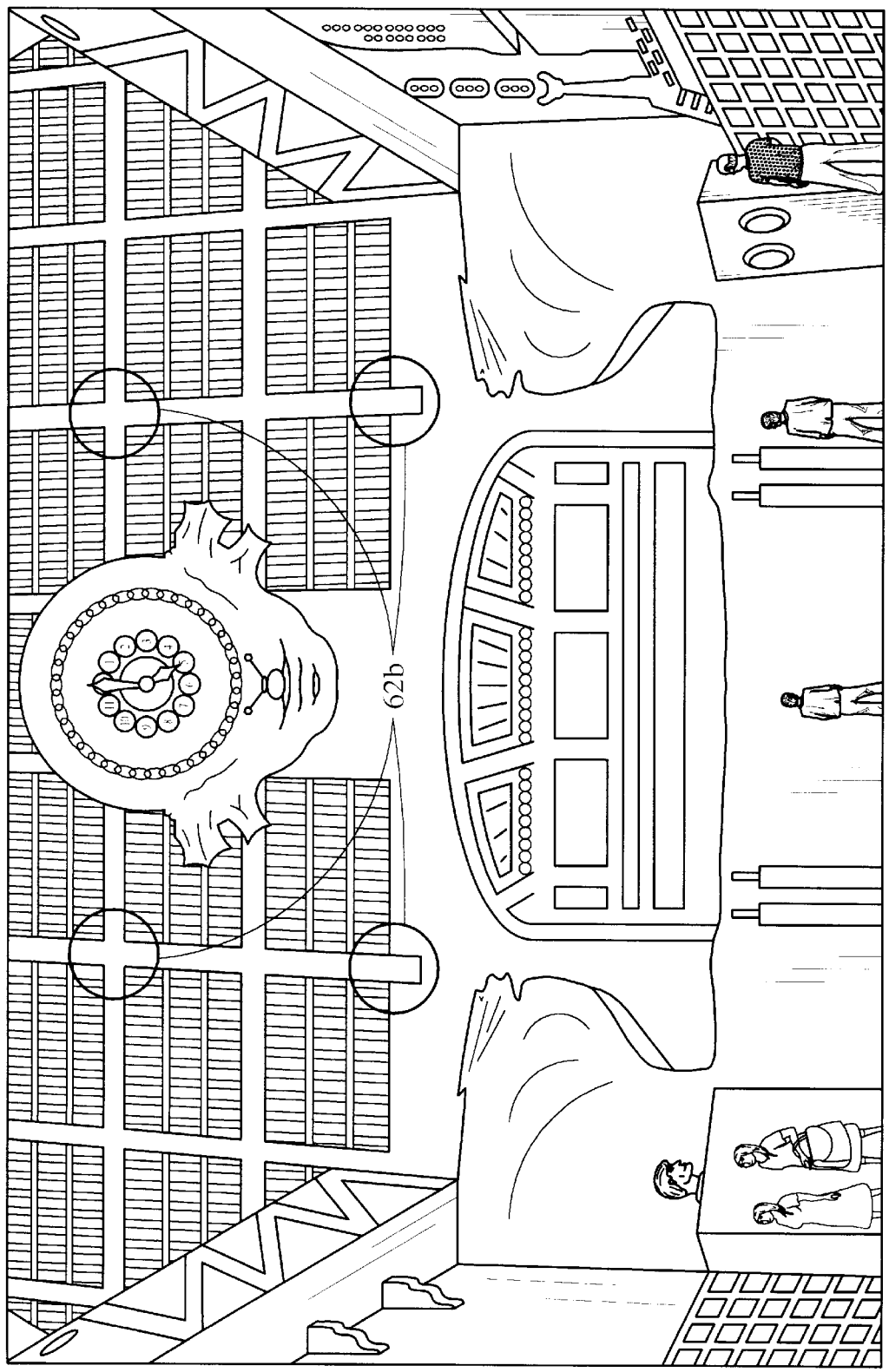
Figure 4C:
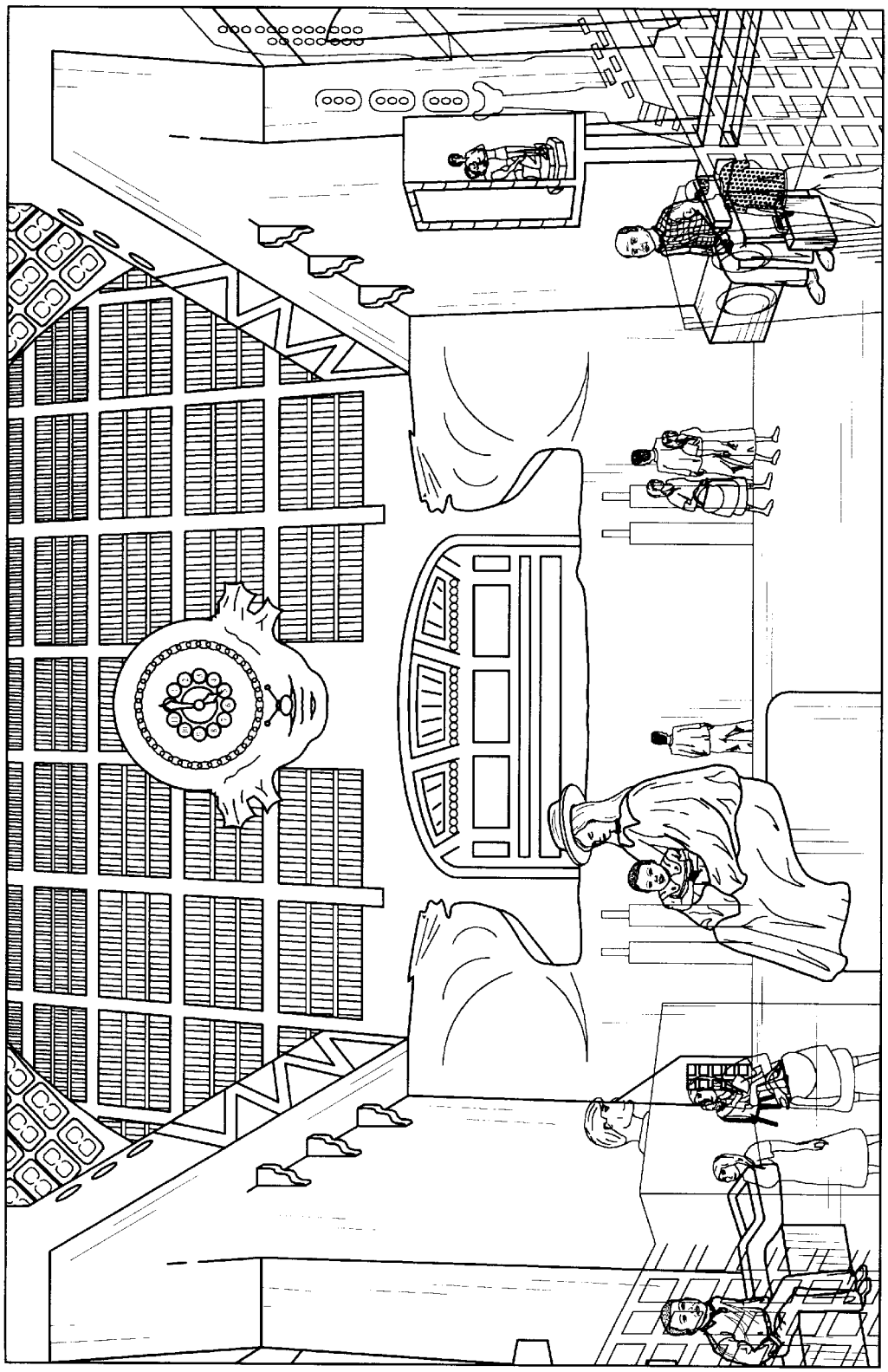

FIG. 3 is a flow chart illustrating the process of simulating motion in an interactive image-based computer-application in accordance with the present invention. FIGS. 4a, 4b, and 4c are example photographic images to which the process is applied. FIG. 4a illustrates a front image 24a of a scene, while FIG. 4b illustrates the back image 24b of the same scene. Since the front and back images 24a and 24b depict the same scene except from different viewpoints, the two images have common features.

Referring to FIGS. 3 and 4a–4c, to simulate a user moving through the scene, the process begins by registering the front image 24a and the back image 24b with one another by transforming one image so that selected common features overlay that of the other image in step 40.

After the images 24a and 24b are registered, an interpolated front transformation is applied to the front image 24a to provide an in-between image in step 42, and an interpolated back transformation is applied to the other image 24b to provide another in-between image in step 44. The front and back in-between images are then composited in step 46 to generate an intermediate image 26, as shown in FIG. 4c. Steps 42–46 may be repeated as necessary to provide as many intermediate images 26 as desired for any given sequence to be rendered. After generating the intermediate images 26, motion is simulated through the scene by rendering the images in sequence in step 48. The front image 24a is rendered at the beginning of the sequence, followed a rendering of the interpolated intermediate images 26, and the back image 24b is rendered at the end of the sequence.

The purpose of the registration process 40 is to find a coordinate transformation that warps the coordinates of one image so that selected common features overlap and align with those of the second image. According to the present invention, the registration of two images 24 is performed using a projective transformation which preserves straight lines and shows the changes in perspective between the two images 24. Other types of mappings, such as a bilinear mapping, result in images having bent lines and other inconsistencies, which are inappropriate for rendering 3D perspective images.

The front 24a and back 24b images are perspective images taken from different viewpoints in a 3D scene. A planar surface visible in each of these images is related by a projective transformation. Since there may be many such planar surfaces in common between the two images, one is chosen in a preferred embodiment based on maximum area, to be the dominant projective plane. The dominant projective plane between the two images is registered via the projective transformation.

Figure 5:
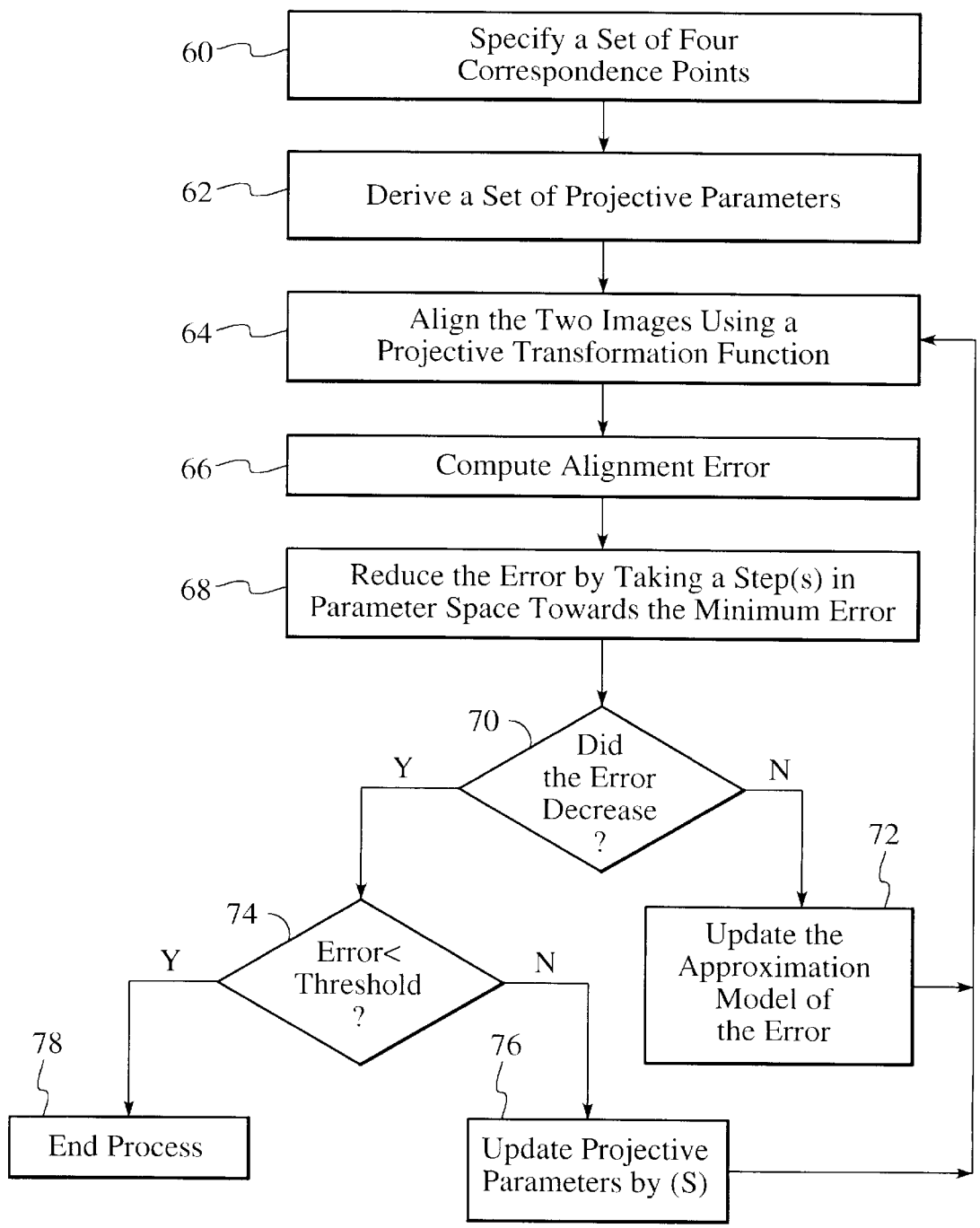
FIG. 5 is a flow chart depicting the registration process.

Referring now to FIG. 5, a flow chart depicting the registration process 40 of FIG. 3 is shown. Given two images, such as front image 28a and back image 28d, the process begins by specifying a set of four correspondence points on the dominant projective plane in each image in step 60. Referring again to FIG. 4a, a set of four correspondence points 62a is shown, and FIG. 4b shows another set of four correspondence points 62b. Each point within each set of correspondence points 62a marks a feature that appears in both images. Specifying four correspondence points 62 enables the common features in both images to be aligned with each other on the dominant projective plane within the scene depicted in the images. The correspondence points 62 serve as a reference for aligning the remaining common features in the images.

In a preferred embodiment of the present invention, the four correspondence points 62 are provided for each image 24 comprising the multimedia application by the developer of the content for the application. When the user interacts with the application, the correspondence points 62 for each image 24 are used to register the images in real-time, as explained with reference to the remaining steps in FIG. 6.

After the correspondence points 62 are specified, a set of projective parameters, m, are derived in step 62 from the correspondence points 62. The projective parameters are used to specify coordinate transformation functions that will be used to transform the points in $I_s$ to the points in $I_d$. In a preferred embodiment, a set of eight projective parameters, $m=[m_0 \ldots m_7]$, are derived from the four correspondence points 62. The eight parameters are embedded into a 3×3 matrix:

$$M = \begin{bmatrix} m_0 & m_3 & m_6 \\ m_1 & m_4 & m_7 \\ m_2 & m_5 & 1 \end{bmatrix}$$

where $m_0$, $m_3$, $m_1$, and $m_4$ correspond to scale and rotation parameters; $m_6$ and $m_7$ correspond to perspective parameters; and $m_2$ and $m_5$ correspond to translation parameters. For further information about correspondence points and projective parameters, see Heckbert, Paul S., *Basic Texture Mappings and Image Warps*, University of California Berkeley, Mar. 29, 1989.

Figure 6:
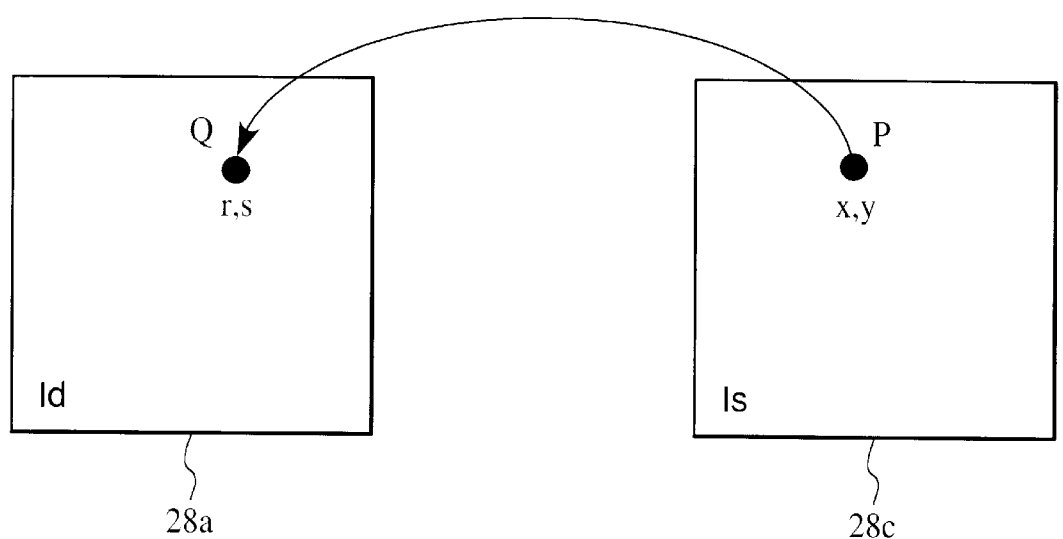
FIG. 6 is a block diagram showing a destination image $I_d$, and a source image $I_s$.

After the projective parameters are derived, the two images are aligned using a coordinate transformation w(p) in step 64. Referring to FIG. 6, The coordinate transformation w(p) is a function of the projective parameters m that warps each point p=(x,y) in the source image $I_s$ to a point q=(r,s) in the destination image $I_d$. This is calculated as follows:

$$r(x, y) = \frac{m_0 x + m_1 y + m_2}{m_6 x + m_7 y + 1}, \quad s(x, y) = \frac{m_3 x + m_4 y + m_2}{m_6 x + m_7 y + 1}$$

The coordinate transformation may be expressed algebraically as:

$$w(p;m)=(r(p;m), s(p;m))=(r(x,y;m), s(x,y;m))$$

After the features of $I_s$ have been aligned with $I_d$, an alignment error is computed in step 68. In a preferred embodiment, the alignment error is measured by computing the sum of the squares of the differences between the intensities of the overlapping portions of the warped image $I_s$ and the destination image $I_d$, and dividing by the number of overlapping pixels to yield the average square error per pixel. This function is then minimized with respect to the projective parameters m.

Before this can be accomplished, however, the region of overlap between the warped image $I_s$ and the destination image $I_d$ must be determined. Using a bounding rectangle $R(I_d)$ of image $I_d$, and a warped bounding rectangle $w(R(I_s))$ of image $I_s$, a set of indices of pixel coordinates in the region of overlap between $I_s$ and $I_d$ may be defined as:

$$\Omega(m)=(i: p_i \in w(R(I_s)) \cap R(I_d))$$

where i=0 . . . n, represents individual pixel locations in $w(R(I_s))$. The number of pixels in the overlapping region is calculated by:

$$A(m)=\text{Card}(\Omega(m)),$$

the cardinality of the set $\Omega(m)$. This can be approximated by the area of a polygon that represents the intersection region.

The alignment error can now be measured by checking the difference in intensities between the warped image $I_s$ and the destination image $I_d$ at each pixel location pi over the entire overlapping region and accumulating the square of the difference value. This is done by first subtracting the pixel values of two images at each pixel location:

$$e_i(m)=I_s(w(p_i;m))-I_d(p_i)$$

The average square error per pixel is then calculated by dividing the number of pixels in the overlapping region:

$$E(m) = \frac{1}{A(m)} \sum_{i \in \Omega(m)} e^2(m)$$

Figure 7:
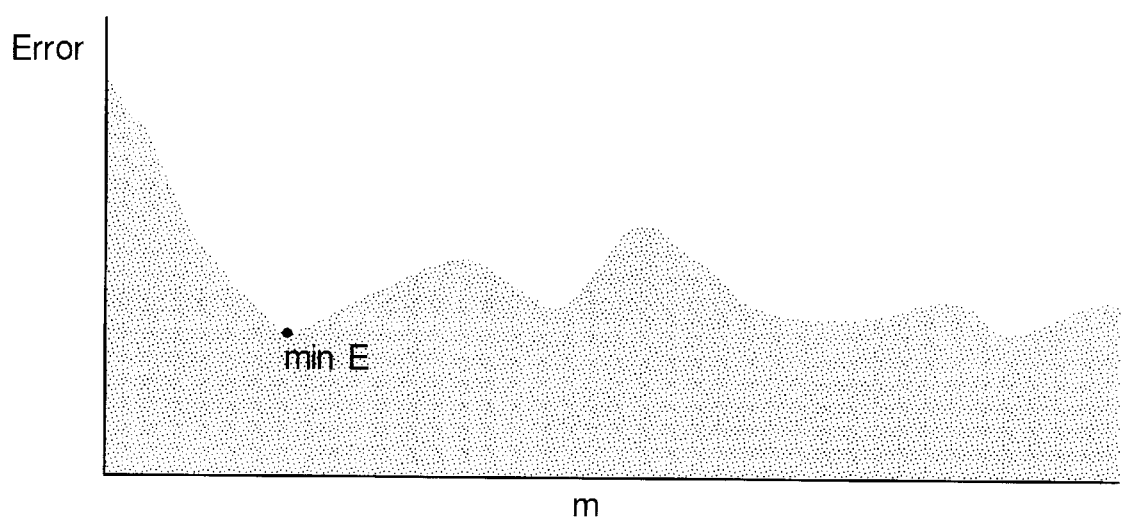
FIG. 7 is a graph illustrating an error function.

FIG. 7 is a graph illustrating the error function E, where the y-axis represents the error value and the x-axis represents one component of the vector m representing the projective parameters. Although a two-dimensional graph is shown, it should be understood that the vector m has eight components and therefore represents an eight dimensional parameter space.

The task is to find the minimum error along the error function E for a set of projection parameters:

$$\min E(m)$$

Since the minimum error function is not known ahead of time, to find the minimum error, the error is analyzed in order to provide an indication of which direction to go in the parameter space to locate the minimum. The error function is approximated quadratically using the gradient, G, of the error with respect to the projective parameters, and a second order derivative of the error, called the Hessian H, as explained further below.

Referring again to FIG. 6, based on the computed error E, the gradient G, and the Hessian H, the error is reduced by taking a step (s) in parameter space towards the minimum error in step 68. Next, it is determined whether the error decreased in step 70. If the error did not decrease, then the model of the error is updated in step 72 (as explained later) and the process continues at step 64.

If the error did decrease, then it is determined whether the error is less than a predetermined threshold in step 74. If the error is not less than a predetermined threshold, then the projective parameter vector (m) is updated by adding the value (s) to m in step 76, and the process continues at step 64. If the error is less than a predetermined threshold, then the process ends in step 78. The end of the registration process results in a warped image $I_s$ in which those features of Is that are common to the destination image $I_d$ are aligned with minimum error, according to the projective transformation parameters m.

The process of approximating the error function using the gradient G and the Hessian H of the error will now be explained in further detail. Referring again to FIG. 7, when the approximation of the error is near the minimum, represented as m*, the negative of the gradient is the direction of steepest descent toward the minimum. This can be used to converge toward the best image registration:

$$G(m^*) = \frac{\partial E(m)}{\partial m}\bigg|_{m=m^*} = \frac{\partial}{\partial m}\left[\frac{1}{A(m)}\sum_{i\in Q(M)}(e_i(m))^2\right]_{m=M^*} = 0$$

where $\partial$ stands for partial differential. At the minimum, m*, the gradient (i.e., the n partial derivatives of E(*) with respect to the components of (m) is equal to zero.

Since $\omega(m)$ is a discrete function, it is assumed that infinitesimal changes in m will not affect $\Omega(m)$, or if they do, that these delta-pixels only contribute the average error to the functional, and hence, will have no effect. In other words, it is assumed that $\Omega(m)$ is constant.

With this assumption the gradient becomes:

$$G(m^*) = \frac{\partial E(m)}{\partial m}\bigg|_{m=m^*} = \left[\frac{1}{A(m)}\sum_{i\in Q(M)}\frac{\partial e_i^2(m)}{\partial m}\right]_{m=M^*} = 0$$

The summand expands out to $$\frac{\partial e_i^2(m)}{\partial m} = 2e_i(m)\frac{\partial e_i(m)}{\partial m}$$

where $$\frac{\partial e_i(m)}{\partial m} = \frac{\partial}{\partial m}[I_s(w(p_i;m)) - I_d(p_i)]$$
$$= \frac{\partial I_s(w(p_i;m))}{\partial m}$$
$$= \frac{\partial I_s(w)}{\partial w}\bigg|_{w=w(p_i;m)}\frac{\partial w(p_i;m)}{\partial m}$$
$$= g_i T_i(m)$$

is the derivative of the error with respect to the parameters m.

The quantity $g_i$ is the image gradient, $$g_i = \nabla I_d(w_i)|_{w_i=w(p_i;m)} = \frac{\partial I_s(w)}{\partial w}\bigg|_{w=w(p_i;m)}$$

which is the intensity of the image $I_d$ evaluated at the warped point $w_i=w(p_i;m)$. As is well known in the art, the image gradient finds the edges in a continuous image.

The quantity $T_i$ is the derivative of the coordinate transformation $W(P_i; m)$ with respect to its projection parameters, evaluated at the point $p_i$ is given by where $$T_i(m) = \frac{\partial w(P_1;m)}{\partial m} = \frac{1}{D_i}\begin{bmatrix} x_i & y_i & 1 & 0 & 0 & 0 & -\frac{x_i N_i^u}{D_i} & -\frac{y_i N_i^u}{D_i} \\ 0 & 0 & 0 & x_i & y_i & 1 & -\frac{x_i N_i^v}{D_i} & -\frac{y_i N_i^v}{D_i} \end{bmatrix}$$

$$N_i^u = m_0 x_i + m_1 y_i + m_2$$
$$N_i^v = m_3 x_i + m_4 y_i + m_5$$
$$D_i = m_6 x_i + m_7 y_i + 1$$

In these expressions, $g_i$ is represented as a 1×2 row vector and $T_i$ as a 2×n matrix, so their concatenation is a 1×n vector.

The gradient of the error functional then becomes $$G(m) = \frac{\partial E(m)}{\partial m} = \frac{2}{A(m)}\sum_{i\in Q(M)} e_i(m) g_i T_i(m)$$

Certain minimization algorithms make use of the Hessian, or second derivative of the functional. However, in many practical optimization problems, there is little advantage in keeping the second-order derivatives of the coordinate transformation found in the second term, since the time involved in its computation may well be used for an extra iteration in the optimization. The approximate Hessian is used instead:

$$H(m) = \frac{2}{A(m)}\sum_{i\in Q(M)}[g_i T_i(m)]^t[g_i T_i(m)]$$

Note that the summand is the outer product of a vector with itself, and hence is a rank 1 matrix of dimension n×n. The sum of these rank 1 matrices can be any rank, however. The error in the neighborhood of a point in parametric space is approximated with a Taylor series $$E(m+s) \approx Q(m+s) = E(m) + sG(m) + \tfrac{1}{2}sH(m)s^t$$

The minimum of this quadratic approximation can be found by setting its s-derivative equal to zero:

$$\frac{\partial Q}{\partial s}(m+s) = G(m) + sH(m) = 0$$

giving s as the solution of $$sH = -G$$

Given that two images are aligned by the vector m given the four correspondence points as a starting point, s represents the deviation from a particular point. Using s, m can be modified to re-align the images in a manner that should decrease the alignment error. The step s to take in parameter space is computed by $$s(H+\lambda I) = -G$$

where $\lambda$ is adjusted at each step to make $(H+\lambda I)$ positive definite, and to adjust the degree to which the approximate error Q(m+s) in the neighborhood of a point agrees with the actual square error Q(m+s). Referring again to FIG. 5, the $\lambda$ is adjusted to update the model if the error doesn't decrease in step 72. The value for $\lambda$ begins at or near zero and increased each iteration to ensure that the error decreases. A Cholesky decomposition $LL^t$ can be used to determine positive-definiteness, and can also be used to solve the equation immediately above for the descent direction s.

The optimum step length to minimize the approximate error Q(m+s) in a particular direction is then found by setting $$\frac{\partial Q(m+\alpha s)}{\partial \alpha} = sG(m) + \alpha sH(m)s^t = 0$$

to yield $$\alpha = -\frac{Gs}{s^t H s}$$

Referring again to FIG. 5, the warping transformation in step 76 is then updated by updating m by $$m^{(k+1)} = m^{(k)} + \alpha s$$

where k is the iteration number, until the averaged square error E(m) converges below the predetermined threshold in step 74. If the alignment resulting from the initial set of projective parameters m derived from the four correspondence points is close enough, the iteration of updating the warping transformation converges quickly. Otherwise, a different set of warping parameters is chosen until one is found that converges.

Referring again to FIG. 3, after the two images have been aligned during the registration process 40 using the transformation matrix M, the transformation matrix M is interpolated to produce as many intermediate images from the original two images as desired, as shown in steps 42–46 of FIG. 3.

If an image is to be displayed at time t=0 and a second image is to be displayed at time t=1, then interpolant matrices are generated from M such that $$M_0(0) = I \quad M_0(t) = M^{-1} M_1(t) \quad M_0(1) = M^{-1}$$
$$M_1(0) = M \quad \quad\quad\quad\quad\quad\quad M_1(1) = I$$

where I is the identity matrix. These interpolant matrices are then applied to the destination image and the warped image to produce registered intermediate images.

Figure 8:
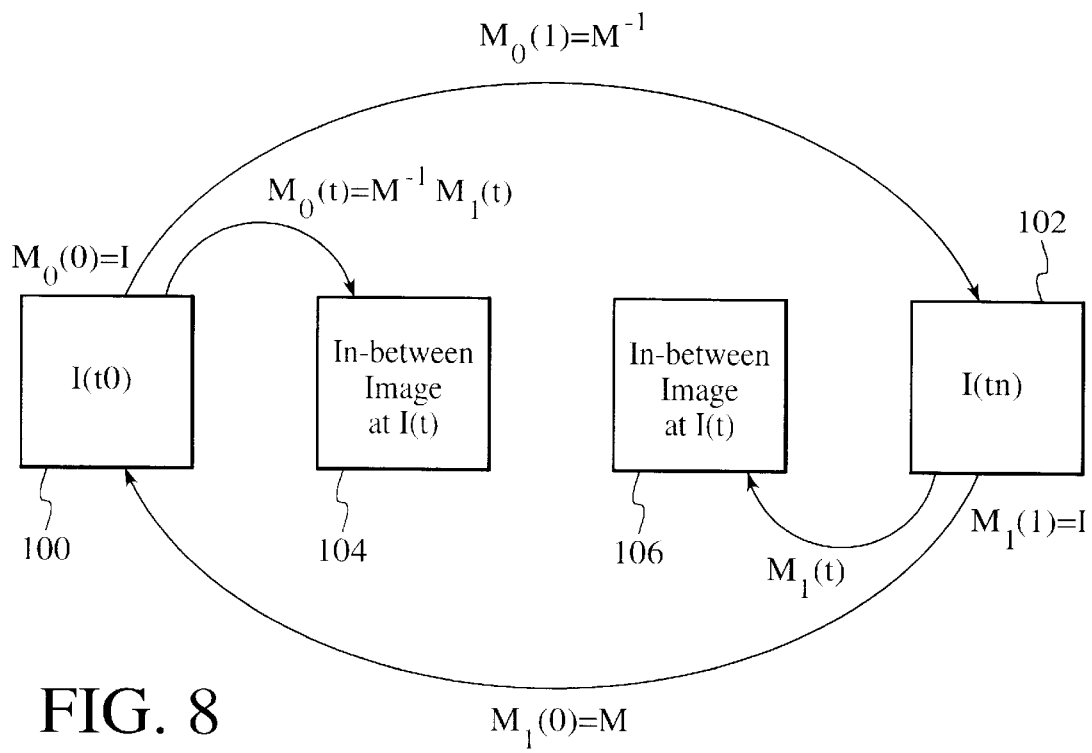
FIG. 8 is a block diagram graphically illustrating the process of applying interpolant matrices to two original images.

FIG. 8 is a block diagram graphically illustrating the process of applying the interpolant matrices to two original images 100 and 102 to generate inbetween images 104 and 106. Assuming image 102 is the source image $I_s$ and image 100 is the destination image $I_d$, the two images are interpolated linearly in time so that 100% of the source image $I_s$ is displayed at t=0, and 100% of image $I_d$ is displayed at t=1.

The in-between images 104 and 106 are generated at time t, 0≤t≤1, as follows. At time t=0, transformation $M_1$=M is applied to image 102 to warp it so that the image registers with image 100. At time t, an interpolated transformation $M_0 = M^{-1} M_1(t)$ is applied to image 100 to generate in-between image 104, and an interpolated transformation $M_1(t)$ is applied to image 102 to generate in-between image 106. In a preferred embodiment, interpolated transformation $M_1(t)$ is calculated by linearly interpolating between M and the identity matrix I:

$$M_1(t) = tI + (1-t)M$$

Figure 9:
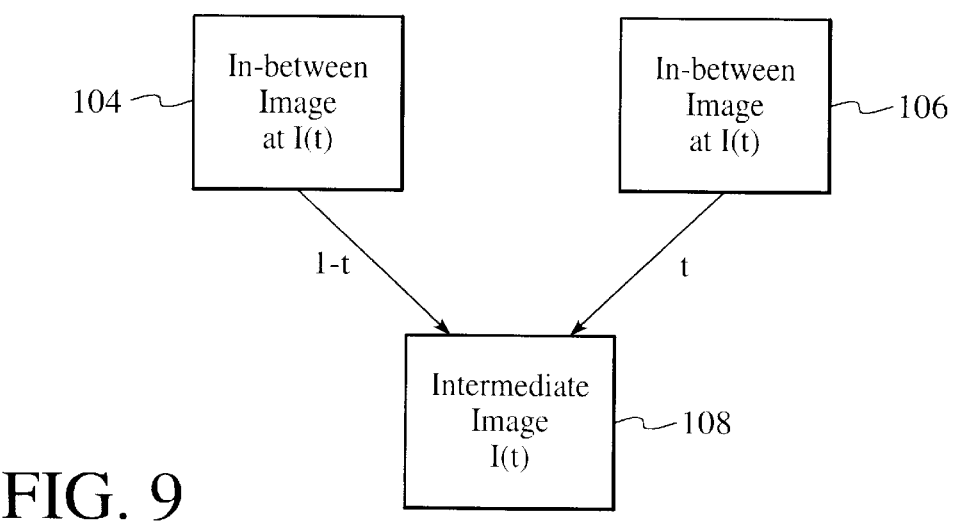
FIG. 9 is a block diagram depicting the process of generating an intermediate image from two in-between images.

Referring now to FIG. 9 a block diagram depicting the process of generating an intermediate image 108 from in-between images 104 and 106 is shown. After the in-between images 104 and 106 are generated, an intermediate image $I_t$ is generated by compositing the in-between images 104 and 106, e.g., by linear interpolation:

$$I_t(p_i;t) = (1-t)I_x(w(p_i;M_0(t))) + tI_d(w(p_i;M_1(t)000$$

One with ordinary skill in the art will realize that other forms of interpolation may yield more desirable effects such as ease-in and ease-out, for example.

After the intermediate image 108 has been generated, smooth motion through the scene is then simulated by rendering image 100 at t=0, rendering the intermediate images 108 at time t, and rendering image 102 at t=1.

As will be appreciated by one with ordinary skill in the art, at t=0 the transformation $M_0$ (0) could be applied to image 100, and transformation $M_1$ (1) could be applied to image 102 at t=1, but this would have no effect on the displayed images since these transformations represent the identity matrix.

It should also be understood that image 100 could represent the source image and image 102 could represent the destination image. In this case, image 100 is registered to image 102 using the transformation $M_0 = M^{-1}$ at t=0, rather than applying $M_1$=M to image 102. The in-between images are then generated by applying the interpolated matrices $M_0$ (0) and $M_1$ (1) to images 102 and 100, respectively.

A system and method for simulating motion in an interactive computer application has been disclosed that synthesizes one or more intermediate views from two extreme views. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for simulating motion in an interactive computer application wherein images of a scene are used to render views of the scene from particular viewpoints, the method comprising the steps of:

(a) registering a first image from a first viewpoint and a second image from a second viewpoint using a registration transformation that overlays common features of both the first and the second image;

(b) generating at least one intermediate image from at least one intermediate viewpoint by applying a first interpolated transformation to the first image and a second interpolated transformation to the second image; and (c) sequentially rendering the first image, the at least one intermediate image, and the second image.

2. A method as in claim 1 wherein step (b) further includes the steps of:

(b1) applying t he first interpolated transformation to generate a first in-between image;

(b2) applying the second interpolated transformation to generate a second in-between image; and (b3) compositing the first in-between image and the second in-between image to generate the at least one intermediate image.

3. A method as in claim 2 wherein step (a) further includes the steps of:

(a1) providing correspondence points on the first image and the second image that identify the common features of the first image and the second image;

(a2) generating the registration transformation as a function of the correspondence points.

4. A method as in claim 3 wherein the registration transformation is a coordinate transformation M.

5. A method as in claim 4 wherein step (b1) further comprises the step of:

(i) generating the first interpolated transformation at time t by calculating $M^{-1} M_1(t)$; and (ii) computing $M_1(t)$ by interpolating between M and an identity matrix I to generate the second interpolated transformation.

6. A method as in claim 5 wherein the interpolation between M and I is a linear interpolation.

7. A system for simulating motion in an interactive computer graphics application comprising:

a plurality of digital images for depicting views of a scene from particular viewpoints;

a memory;

a processor coupled to the memory; and a rendering system executed by the processor, the rendering system including, means for registering a first image from a first viewpoint and a second image from a second viewpoint using a registration transformation that overlays common features of both the first and the second image;

means for generating at least one intermediate image from at least one intermediate viewpoint by applying a first interpolated transformation to the first image and a second interpolated transformation to the second image; and means for sequentially rendering the first image, the intermediate image, and the second image.

8. A system as in claim 7 applying the first interpolated transformation generates a first in-between image, applying the second interpolated transformation generates a second in-between image, the rendering system further including means for compositing the first in-between image and the second in-between image to generate the at least one intermediate image.

9. A system as in claim 8 wherein correspondence points are provided on the first image and the second image that identify the common features of the first image and the second image and wherein the registration means generates the registration transformation as a function of the correspondence points.

10. A system as in claim 9 wherein the registration transformation is a projective coordinate transformation M.

11. A system as in claim 10 wherein the generation means generates the first interpolated transformation at time t by calculating $M^{-1}M_1(t)$, and computes $M_1(t)$ by interpolating between M and an identity matrix I to generate the second interpolated transformation.

12. A method for simulating motion in an interactive computer graphics application wherein digital images of a scene are used to render views of the scene from particular viewpoints, the method comprising the steps of:

(a) registering a first image from a first viewpoint and a second image from a second viewpoint using a registration transformation that overlays common features of the first image on those of the second image;

(b) applying a first interpolated transformation to the first image to generate a first in-between image;

(c) applying a second interpolated transformation to the second image to generate a second in-between image;

(d) compositing the first in-between image and the second in-between image to generate an intermediate image from an intermediate viewpoint; and (e) sequentially rendering the first image, the intermediate image, and the second image.

13. A method as in claim 12 wherein step (a) further includes the steps of:

(a1) providing correspondence points on the first image and the second image that identify the common features of the first image and the second image;

(a2) deriving a set of projective parameters from the correspondence points, wherein the projective parameters define a parameter space;

(a3) generating an initial registration transformation from the correspondence points;

(a4) after registering the first image and the second image, computing an alignment error;

(a5) reducing the alignment error by taking a step(s) in parameter space towards a minimum error; and (a6) updating the projective parameters by adding (s) to the projective parameters and re-registering the first and second images if the error did not decrease below a predetermined value.

14. A method as in claim 13 wherein step (a4) further includes the steps of:

(i) computing a gradient of the error with respect to the alignment error, and a second order derivative of the error.

15. A method as in claim 14 wherein step (b) further comprises the step of:

(i) generating the first interpolated transformation by calculating $M^{-1}M_1(t)$, where $M_1(t)$ is the second interpolated transformation.

16. A method as in claim 15 wherein step (c) further comprises the step of:

(i) generating the second interpolated transformation by linearly interpolating between M and an identity matrix I at time t by $M(t)=tI+(1-t)M$.

17. A computer-readable medium containing program instructions for simulating motion in an interactive computer application wherein images of a scene are used to render views of the scene from particular viewpoints, the program instructions for:

(a) registering a first image from a first viewpoint and a second image from a second viewpoint using a registration transformation that overlays common features of both the first and the second image;

(b) generating at least one intermediate image from at least one intermediate viewpoint by applying a first interpolated transformation to the first image and a second interpolated transformation to the second image; and (c) sequentially rendering the first image, the at least one intermediate image, and the second image.

18. A computer-readable medium as in claim 17 wherein instruction (b) further includes the instructions of:

(b1) applying the first interpolated transformation to generate a first in-between image;

(b2) applying the second interpolated transformation to generate a second in-between image; and (b3) compositing the first in-between image and the second in-between image to generate the at least one intermediate image.

19. A computer-readable medium as in claim 18 wherein instruction (a) further includes the instructions of:

(a1) providing correspondence points on the first image and the second image that identify the common features of the first image and the second image;

(a2) generating the registration transformation as a function of the correspondence points.

20. A computer-readable medium as in claim 19 wherein the registration transformation is a projective coordinate transformation M.

21. A computer-readable medium as in claim 20 wherein instruction (b1) further comprises the instruction of:

(i) generating the first interpolated transformation at time t by calculating $M^{-1}M_1(t)$; and (ii) computing $M_1(t)$ by interpolating between M and an identity matrix I to generate the second interpolated transformation.

* * * * *